US009536251B2

(12) United States Patent
Huang et al.

(10) Patent No.: US 9,536,251 B2
(45) Date of Patent: Jan. 3, 2017

(54) PROVIDING ADVERTISEMENTS IN AN AUGMENTED REALITY ENVIRONMENT

(75) Inventors: Wyatt (Ling-Wei) Huang, Taipei (TW); Balduran (Chia-Chun) Chang, Hsinchu (TW); Connie (Shih-Ting) Huang, Taipei (TW)

(73) Assignee: Excalibur IP, LLC, Sunnyvale, CA (US)

( * ) Notice: Subject to any disclaimer, the term of this patent is extended or adjusted under 35 U.S.C. 154(b) by 38 days.

(21) Appl. No.: 13/296,236

(22) Filed: Nov. 15, 2011

(65) Prior Publication Data

US 2013/0124326 A1 May 16, 2013

(51) Int. Cl.
G06Q 30/02 (2012.01)

(52) U.S. Cl.
CPC ...... *G06Q 30/0255* (2013.01); *G06Q 30/0252* (2013.01); *G06Q 30/0261* (2013.01); *G06Q 30/0267* (2013.01)

(58) Field of Classification Search
CPC .................................................. G06Q 30/0267
See application file for complete search history.

(56) References Cited

U.S. PATENT DOCUMENTS

| 5,952,993 | A * | 9/1999 | Matsuda et al. ............... 345/474 |
| 6,330,356 | B1 * | 12/2001 | Sundareswaran et al. ... 382/154 |
| 6,879,320 | B2 * | 4/2005 | Maercovich et al. ........ 345/211 |
| 6,891,518 | B2 * | 5/2005 | Sauer et al. ....................... 345/8 |
| 7,064,742 | B2 * | 6/2006 | Navab et al. ................. 345/156 |
| 7,116,342 | B2 * | 10/2006 | Dengler et al. ............... 345/630 |
| 7,296,747 | B2 * | 11/2007 | Rohs ........................ 235/462.08 |
| 7,305,691 | B2 * | 12/2007 | Cristofalo ....................... 725/34 |
| 7,596,269 | B2 * | 9/2009 | King et al. ..................... 382/177 |
| 7,768,534 | B2 * | 8/2010 | Pentenrieder et al. ........ 345/633 |
| 7,855,638 | B2 * | 12/2010 | Huston .................... 340/539.13 |
| 7,886,226 | B1 * | 2/2011 | McCoy et al. ................ 715/273 |
| 7,946,492 | B2 * | 5/2011 | Rohs ........................ 235/462.08 |
| 7,969,383 | B2 * | 6/2011 | Eberl et al. ....................... 345/7 |
| 8,010,702 | B2 * | 8/2011 | Farouk .......................... 709/246 |
| 8,072,470 | B2 * | 12/2011 | Marks ........................... 345/632 |
| 8,099,316 | B2 * | 1/2012 | Moukas et al. .............. 705/7.29 |
| 8,135,624 | B1 * | 3/2012 | Ramalingam et al. ...... 705/26.1 |
| 8,140,403 | B2 * | 3/2012 | Ramalingam et al. ...... 705/26.1 |
| 8,149,110 | B2 * | 4/2012 | Troxler ................... 340/539.11 |

(Continued)

OTHER PUBLICATIONS

Lu, Yuzhu, Methods for Augmented Reality E-Commerce Iowa State University, Thesis, 2007.*

(Continued)

*Primary Examiner* — Scott L Jarrett
(74) *Attorney, Agent, or Firm* — Brinks Gilson & Lione (57) ABSTRACT

A computer-implemented method for providing advertisements in an augmented reality environment to a user includes receiving data related to a marker, the marker placed amongst one or more physical objects captured by the video camera. The computer-implemented method also includes retrieving dynamic digital content associated with the marker. Further, the computer-implemented method includes displaying the dynamic digital content amongst the one or more physical objects. Furthermore, the computer-implemented method includes receiving a user interaction with the dynamic digital content. Moreover, the computer-implemented method includes performing an action based on the user interaction.

15 Claims, 6 Drawing Sheets

(56) References Cited

U.S. PATENT DOCUMENTS

| | | | |
|---|---|---|---|
| 8,234,218 B2* | 7/2012 | Robinson et al. | 705/54 |
| 8,255,284 B1* | 8/2012 | Ramalingam et al. | 705/26.1 |
| 8,264,544 B1* | 9/2012 | Chang et al. | 348/169 |
| 8,340,504 B2* | 12/2012 | Southworth | G06T 19/006 386/280 |
| 8,341,029 B1* | 12/2012 | Ramalingam et al. | 705/26.1 |
| 8,392,552 B2* | 3/2013 | Alexander et al. | 709/224 |
| 8,542,250 B2* | 9/2013 | Baseley | G06T 7/0042 345/419 |
| 8,542,906 B1* | 9/2013 | Persson et al. | 382/154 |
| 8,638,908 B2* | 1/2014 | Leeds et al. | 379/76 |
| 8,657,809 B2* | 2/2014 | Schoepp | 606/1 |
| 8,745,194 B2* | 6/2014 | Uribe-Etxebarria Jimenez | 709/223 |
| 8,749,396 B2* | 6/2014 | Maggiore | 340/686.1 |
| 9,058,764 B1* | 6/2015 | Persson et al. | |
| 2002/0016801 A1* | 2/2002 | Reiley et al. | 707/523 |
| 2002/0094189 A1* | 7/2002 | Navab et al. | 386/4 |
| 2002/0152117 A1* | 10/2002 | Cristofalo et al. | 705/14 |
| 2003/0005439 A1* | 1/2003 | Rovira | H04N 7/163 725/37 |
| 2003/0078838 A1* | 4/2003 | Szmanda | 705/14 |
| 2005/0010697 A1* | 1/2005 | Kinawi et al. | 710/1 |
| 2006/0130095 A1* | 6/2006 | Willis et al. | 725/42 |
| 2007/0100688 A1* | 5/2007 | Book | 705/14 |
| 2007/0205963 A1* | 9/2007 | Piccionelli et al. | 345/7 |
| 2007/0230374 A1* | 10/2007 | Altberg et al. | 370/271 |
| 2007/0248283 A1* | 10/2007 | Mack et al. | 382/284 |
| 2008/0155396 A1* | 6/2008 | Dubinko et al. | 715/251 |
| 2008/0163379 A1* | 7/2008 | Robinson et al. | 726/27 |
| 2008/0186255 A1* | 8/2008 | Cohen et al. | 345/8 |
| 2009/0061901 A1* | 3/2009 | Arrasvuori et al. | 455/456.3 |
| 2009/0286570 A1* | 11/2009 | Pierce, Jr. | 455/556.1 |
| 2009/0300100 A1* | 12/2009 | Freer | 709/203 |
| 2010/0111405 A1* | 5/2010 | Lee et al. | 382/160 |
| 2010/0135419 A1* | 6/2010 | Doser et al. | 375/240.26 |
| 2010/0156933 A1* | 6/2010 | Jones | G06Q 30/02 345/629 |
| 2010/0211866 A1* | 8/2010 | Nicholas et al. | 715/234 |
| 2011/0040539 A1* | 2/2011 | Szymczyk et al. | 703/6 |
| 2011/0149090 A1* | 6/2011 | Berthiaume et al. | 348/207.1 |
| 2011/0161163 A1* | 6/2011 | Carlson et al. | 705/14.44 |
| 2011/0213664 A1* | 9/2011 | Osterhout et al. | 705/14.58 |
| 2011/0218854 A1* | 9/2011 | Shamlian | 705/14.49 |
| 2011/0225069 A1* | 9/2011 | Cramer et al. | 705/27.1 |
| 2011/0246276 A1* | 10/2011 | Peters et al. | 705/14.24 |
| 2011/0279445 A1* | 11/2011 | Murphy et al. | 345/419 |
| 2011/0307786 A1* | 12/2011 | Shuster | 715/723 |
| 2012/0022924 A1* | 1/2012 | Runnels et al. | 705/14.4 |
| 2012/0067954 A1* | 3/2012 | Moganti et al. | 235/451 |
| 2012/0110477 A1* | 5/2012 | Gaume | 715/757 |
| 2012/0113142 A1* | 5/2012 | Adhikari et al. | 345/633 |
| 2012/0113143 A1* | 5/2012 | Adhikari et al. | 345/633 |
| 2012/0113274 A1* | 5/2012 | Adhikari et al. | 348/207.1 |
| 2012/0116559 A1* | 5/2012 | Davis et al. | 700/94 |
| 2012/0116920 A1* | 5/2012 | Adhikari et al. | 705/26.61 |
| 2012/0154633 A1* | 6/2012 | Rodriguez | 348/231.99 |
| 2012/0154638 A1* | 6/2012 | Chou | 348/239 |
| 2012/0167135 A1* | 6/2012 | Yu et al. | 725/35 |
| 2012/0173426 A1* | 7/2012 | Foster et al. | 705/44 |
| 2012/0176410 A1* | 7/2012 | Meier et al. | 345/633 |
| 2012/0176516 A1* | 7/2012 | Elmekies | 348/239 |
| 2012/0181330 A1* | 7/2012 | Kim | 235/375 |
| 2012/0204307 A1* | 8/2012 | De Mattei et al. | 2/69 |
| 2012/0218263 A1* | 8/2012 | Meier et al. | 345/419 |
| 2012/0233070 A1* | 9/2012 | Calman et al. | 705/41 |
| 2012/0237085 A1* | 9/2012 | Meier | 382/103 |
| 2012/0293325 A1* | 11/2012 | Lahcanski et al. | 340/539.13 |
| 2012/0322041 A1* | 12/2012 | Weisman | 434/308 |
| 2013/0013499 A1* | 1/2013 | Kalgi | 705/41 |
| 2013/0016193 A1* | 1/2013 | Nepveu | 348/51 |
| 2013/0038632 A1* | 2/2013 | Dillavou et al. | 345/633 |
| 2013/0072308 A1* | 3/2013 | Peck et al. | 463/42 |
| 2013/0100139 A1* | 4/2013 | Schliesser et al. | 345/467 |
| 2013/0127980 A1* | 5/2013 | Haddick et al. | 348/14.08 |
| 2013/0129252 A1* | 5/2013 | Lauper et al. | 382/276 |
| 2013/0222371 A1* | 8/2013 | Reitan | G06T 19/006 345/419 |
| 2013/0232430 A1* | 9/2013 | Reitan | G09G 3/003 715/765 |

OTHER PUBLICATIONS

Zhang, Ziang et al., E-Commerce Direct Marketing using Augmented Reality IEEE, 2000.*
Azuma, Ronald et al., Recent Advances in Augmented Reality IEEE, Nov./Dec. 2001.*
Zhu, Wei et al., Personalized In-store E-Commerce with the PromoPad: an Augmented Reality Shopping Assistant Electronic Journal for E-Commerce Tools and Applications, 2004.*
Kurkovsky, Stan et al., Using ubiquitous computing in interactive mobile marketing Pers Ubiquit Computing 2006.*
Hristova, Nataliya et al., Ad-me: Wireless Advertising Adapted to the User Location, Device and Emotions Proceedings of the 37th Hawaii International Conference on System Sciences, 2004.*
Huang, Yu et al., Visual Ads Insertion in Street Building Views For Augmented Reality 18th IEEE International Conference on Image Process, 2011.*
Douglas, Ian, Advertisers pile into augmented reality Telegraph, Nov. 24, 2009.*
Guven, Sinem et al., Social Mobile Augmented Reality for Retail IEEE, 2009.*
Gao, Jerry Zeyu et al., Understanding 2D-BarCode Technology and Applications in M-Commerce—Design and Implementaiton of a 2D Barcode Processing Solution, 31st Annual International Computer Software and Applications Conference, IEEE, 2007.*
Kan, Tai-Wei et al., QR Code Based Augmented Reality Applications (Chapter 16) Handbook of Augmented Reality, 2011.*
Koller, Dieter et al., Real-time Vision-Based Camera Tracking for Augmented Reality Applications in Proceedings of the Symposium on Virtual Reality Software and Technology, Sep. 15-17, 1997.*
Ababsa, Fakreddine et al., Vision-Based Tracking for Mobile Augmented Reality Studies in Computational Intelligence, vol. 120, 2008.*
Stovne, Jorgen, A Crash Course in Augmented Reality IHaveAnIdea.org, Aug. 19, 2009.*
Rose, Stephen et al., Augmented Reality: A Review of available Augmented Reality packages and evaluation of their potential use in an educational context; University of Exeter, Nov. 2010.*
Henrysson, Anders, Brining Augumented Reality to Mobile Phones Linkopings University, Dissertations No. 1145, Nov. 2007.*
Carmigniani, Julie et al., Augmented reality technologies, systems and applications Multimedia Tools Appl., 2011.*
Perez, Sarah, Hot, Hot, Hot! A Twiter Augmented Reality App for iPhone ReadWrite.com, Jul. 8, 2009.*

* cited by examiner

PROVIDING ADVERTISEMENTS IN AN AUGMENTED REALITY ENVIRONMENT

TECHNICAL FIELD

Embodiments of the disclosure relate generally, to targeted advertising, and more specifically, advertisements in an augmented reality environment.

BACKGROUND

Augmented Reality (AR) enhances a person's current perception of reality with computer generated output with, for example, sound, video and graphics. AR gives a live view of a physical, real-world environment where objects in the environment are augmented. Artificial information about environment and associated physical objects can be overlaid on the real world. With the help of AR, information around the real world becomes interactive. AR technologies have been enhancing interaction of users with the real world using computer generated virtual objects. Moreover, usage of AR to promote products with interactive AR applications is becoming common. Shopping environment using AR, however, poses more challenges.

Various traditional methods of advertising exist, for example, light box advertising, posterior or exterior wall advertising, and out-of-home advertising. However, the traditional methods have only fixed content that are displayed to the user. Further, advertisements are not interactive with the user. Interactive advertisements stills remain a challenge.

In light of the foregoing discussion, there is a need to dynamically provide advertisements in an augmented reality environment.

SUMMARY

The above-mentioned needs are met by a method, system, and computer program product for providing interactive advertisements in an augmented reality environment.

An example of a computer-implemented method for providing advertisements in an augmented reality environment includes receiving data related to a marker, the marker placed amongst one or more physical objects captured by the video camera. The computer-implemented method also includes retrieving dynamic digital content associated with the marker. Further, the computer-implemented method includes displaying the dynamic digital content amongst the one or more physical objects. Furthermore, the computer-implemented method includes receiving a user interaction with the dynamic digital content. Moreover, the computer-implemented method includes performing an action based on the user interaction.

An example of a computer program product stored on a non-transitory computer-readable medium that when executed by a processor, performs a method for providing advertisements in an augmented reality environment, includes data related to a marker, the marker placed amongst one or more physical objects captured by the video camera. The computer program product also includes retrieving dynamic digital content associated with the marker. Further, the computer program product includes displaying the dynamic digital content amongst the one or more physical objects. Furthermore, the computer program product includes receiving a user interaction with the dynamic digital content. Moreover, the computer program product includes performing an action based on the user interaction.

An example of a system for providing advertisements in an augmented reality environment includes a video camera to receive data related to a marker, the marker placed amongst one or more physical objects captured by the video camera. The system also includes a network interface to retrieve dynamic digital content associated with the marker. Further, the system includes a display device to display the dynamic digital content amongst the one or more physical objects. Furthermore, the system includes a user interface to receive a user interaction with the dynamic digital content. Moreover, the system includes an interaction module to perform an action based on the user interaction Advantageously, a user can view and interact with advertisements in an augmented reality environment.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A method, system, and computer program product for providing advertisements in an augmented reality environment to a user is disclosed. The augmented reality environment refers, in one embodiment, to a live view of a physical, real-world environment which is modified by a device having a video camera and display.

The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
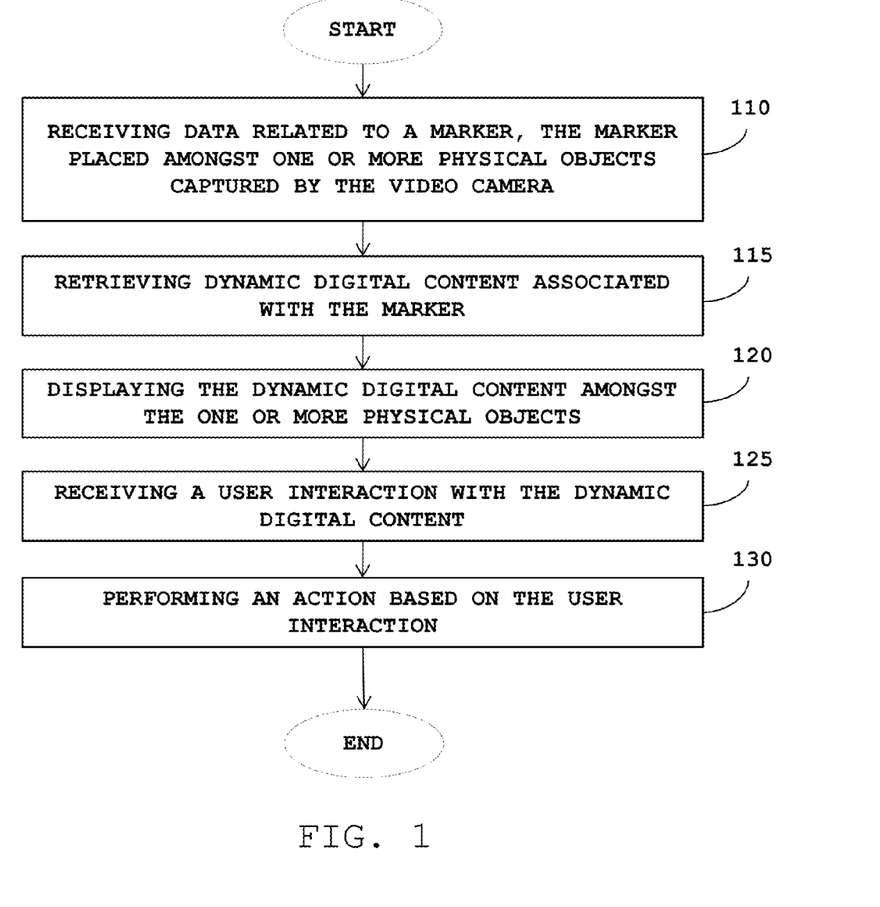
FIG. 1 is a flow diagram illustrating a method for providing advertisements in an augmented reality environment, in accordance with one embodiment.

FIG. 1 is a flow diagram illustrating a method for providing advertisements in an augmented reality environment, in accordance with one embodiment.

At step 110, data related to a marker is received. The marker is placed amongst one or more physical objects and then captured by a video camera, a photograph, a video stream, or just a still frame.

A user of the device places the video camera over the one or more physical objects in real world. The physical objects are fitted with markers. The markers are specific patterns that are detected by augmented reality. The video camera captures the physical object and data related to the marker is received. The data includes, but is not limited to, position, rotation and scale of the marker.

In one embodiment, the marker includes a Quick Response (QR) code marker. The QR code marker follows a specific pattern in the physical object and is represented as black and white squares. The black and white squares represent an encoded string of characters. The characters are first encoded as bits (zeros and ones) and later printed as the black and white squares.

A marker can be recognized by, for example, a mobile application executing on a cell phone or PDA. In one embodiment, the application is always detecting markers, and in another embodiment, the application detects markers upon request by a user.

At step 115, dynamic digital content associated with the marker, such as an interactive advertisement, is retrieved.

The marker is converted to a network address. Using the network address the dynamic digital content is retrieved. In one embodiment, a Universal Resource Locator (URL) is retrieved which leads to a website. The URL can be accessed and downloaded over a data network, a cellular network, or the like. The dynamic digital content can be stored locally in RAM for immediate display, or stored in memory as a prefetch for a later display.

The digital content is considered dynamic because, in one embodiment, the digital content is constantly updated. As a result, dynamic data retrieved for a first user can differ from dynamic data retrieved for a second user. Many factors can be used to determine which dynamic data to send responsive to a request. Exemplary factors include user profile, time, day, location (e.g., as determined by an integrated GPS), mood, preferences, and other context factors.

At step 120, the dynamic digital content is displayed amongst the one or more physical objects. In one embodiment, a user can see real objects integrated in a video display with augmented reality objects. One example is discussed below with respect to FIG. 2. The video display can be at any resolution such as standard, high definition, or 3-dimensional, and of any format such as MP4.

A mobile application can include a video renderer. In operation, the video renderer combines, or overlays multiple video streams into a single stream. One stream is the real world video and another stream is the augmented reality video generated from the dynamic digital content. Based on the movements of the video camera, in relation to the markers, display of the dynamic digital content is adjusted. As the user moves the video camera across the physical objects, step 110, step 115 and step 120 are performed. For example, consider the video camera placed over an image of spacetti in a magazine. An advertisement related to different types of spaghetti is displayed. At this point, the video camera is moved to another image of sports shoes in the magazine. Consequently, an advertisement related to various brands of the sports shoes is displayed to the user.

A variation of the dynamic digital content is selected in accordance with at least one of time, date, location, information about a user, a user preference, and display capability of a device.

At step 125, a user interaction with the dynamic digital content is received.

The dynamic digital content includes a mechanism to make a purchase. For example, the user can buy a product displayed in the advertisement using a BUY button.

At step 130, an action is performed based on the user interaction.

Examples of the action includes, but are not limited to, purchasing a product, posting a comment related to an advertisement and a commenting on Twitter.

Figure 2:
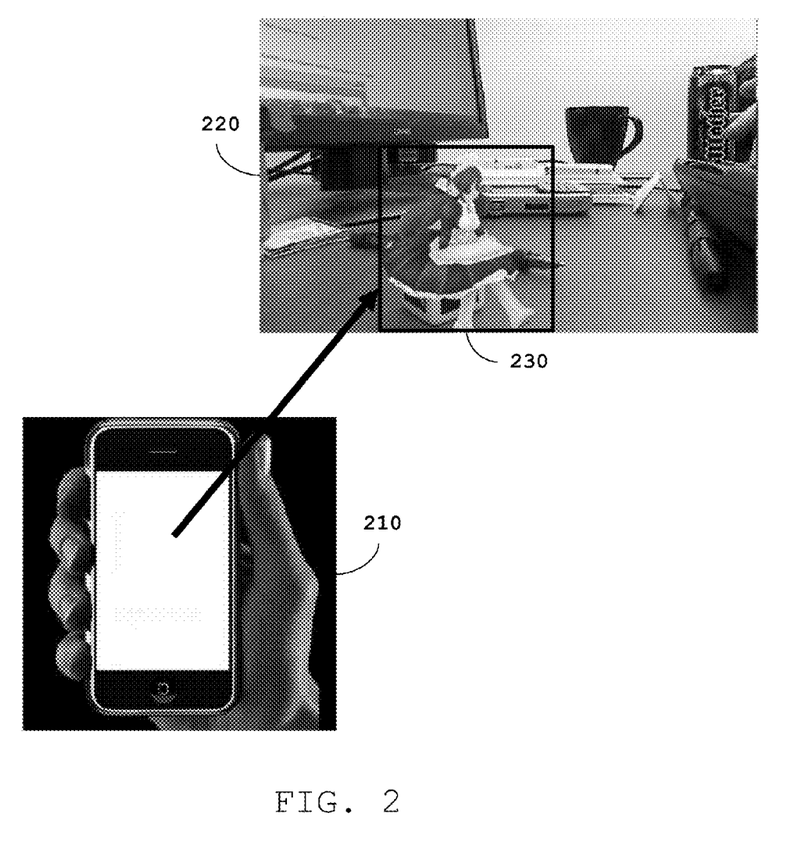
FIG. 2 is a schematic diagram illustrating interaction of an augmented reality model with physical world, in accordance with one embodiment.

FIG. 2 is a schematic diagram illustrating interaction of an augmented reality model with physical world, in accordance with one embodiment.

A mobile device 210 is placed in the augmented reality environment 220. A camera in the mobile device 210 captures markers from the augmented reality environment 220 and, in response, displays a girl 230 sitting on a physical box.

Figure 3:
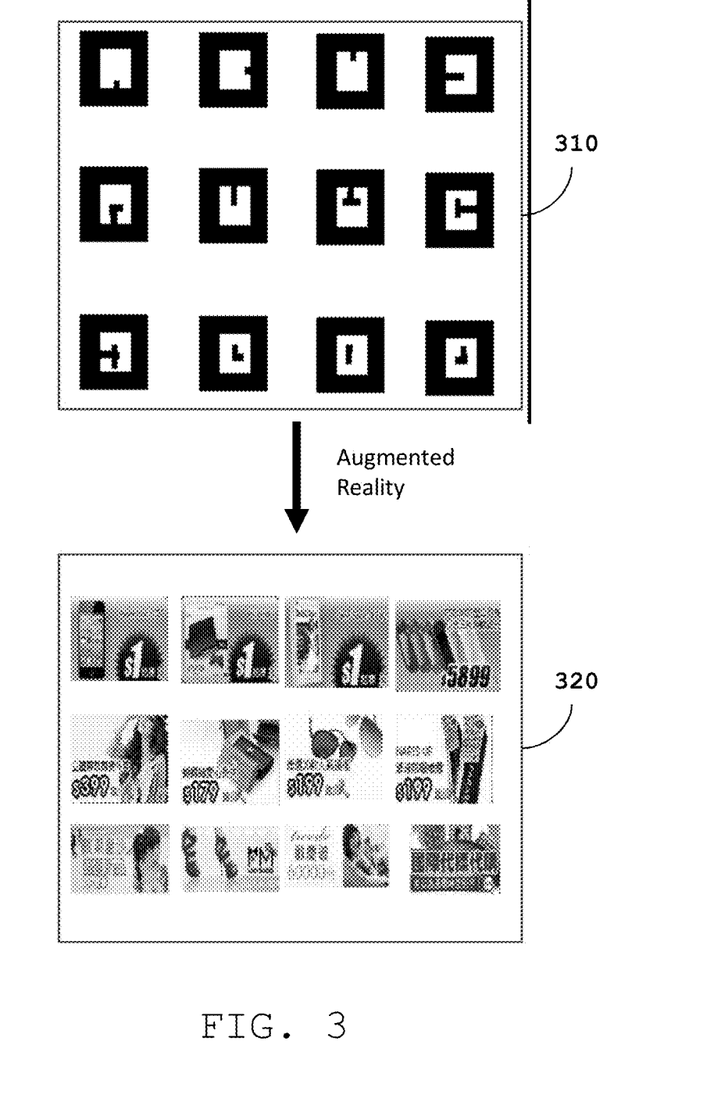
FIG. 3 is a schematic diagram illustrating markers and corresponding dynamic digital content, in accordance with one embodiment.

FIG. 3 is a schematic diagram illustrating markers and corresponding dynamic digital content, in accordance with one embodiment.

A plurality of markers 310 represents specific patterns of images that are detected by augmented reality. For each of the markers 310 corresponding augmented reality dynamic digital content is shown. The dynamic digital content includes advertisements 320. Further, each of the markers 310 is unique and corresponds to one of the advertisements 320.

The advertisements 320 are dynamic. Content of the advertisements 320 can change based on a plurality of factors, for example, time and location of video camera.

Figure 4:
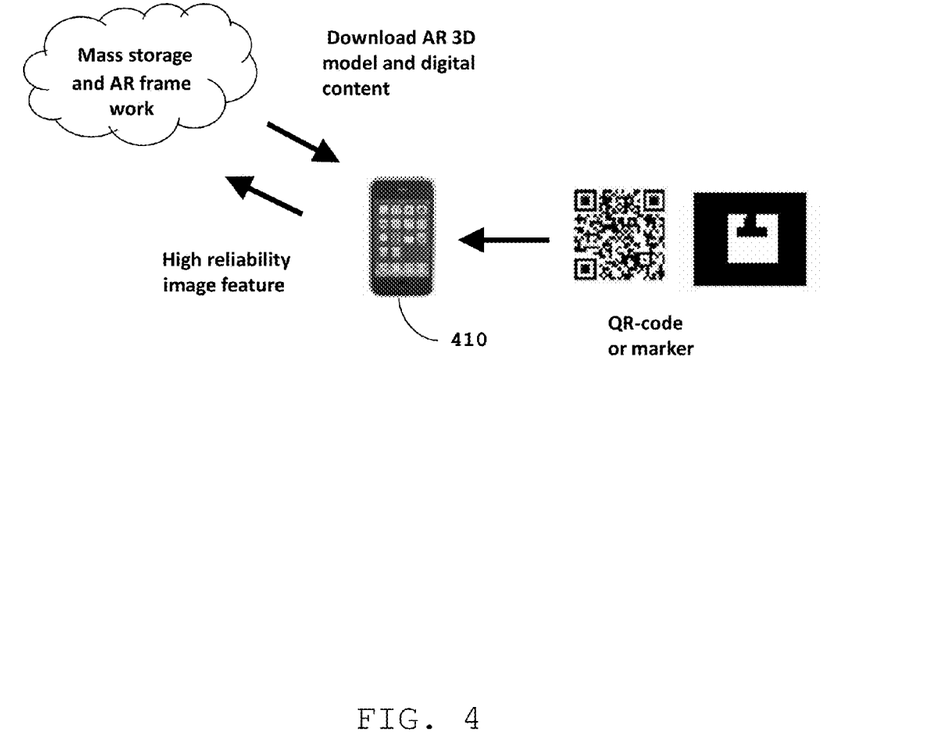
FIG. 4 is a schematic diagram illustrating a method to retrieve augmented reality contents, in accordance with one embodiment.

FIG. 4 is a schematic diagram illustrating a method to retrieve augmented reality contents, in accordance with one embodiment.

A mobile device 410 captures a marker or a (Quick Response) QR code marker in an augmented environment. The QR code marker follows a specific pattern in the physical object and is represented as black and white squares. The black and white squares represent an encoded string of characters.

In one embodiment, the mobile device 410 can also be a Personal Computer (PC), a laptop or notebook computer, a tablet computer, a smart phone or Personal Digital Assistant (PDA), a smart appliance, a video gaming console, an Internet television, a set-up box, or any other suitable processor-based device that can view advertisements.

Based on the captured marker or QR code marker, a high reliability image feature is sent to a mass storage and augmented reality framework. At this point, the mobile device 410 retrieves augmented reality 3D model and dynamic digital content from the mass storage and augmented reality framework.

Figure 5:
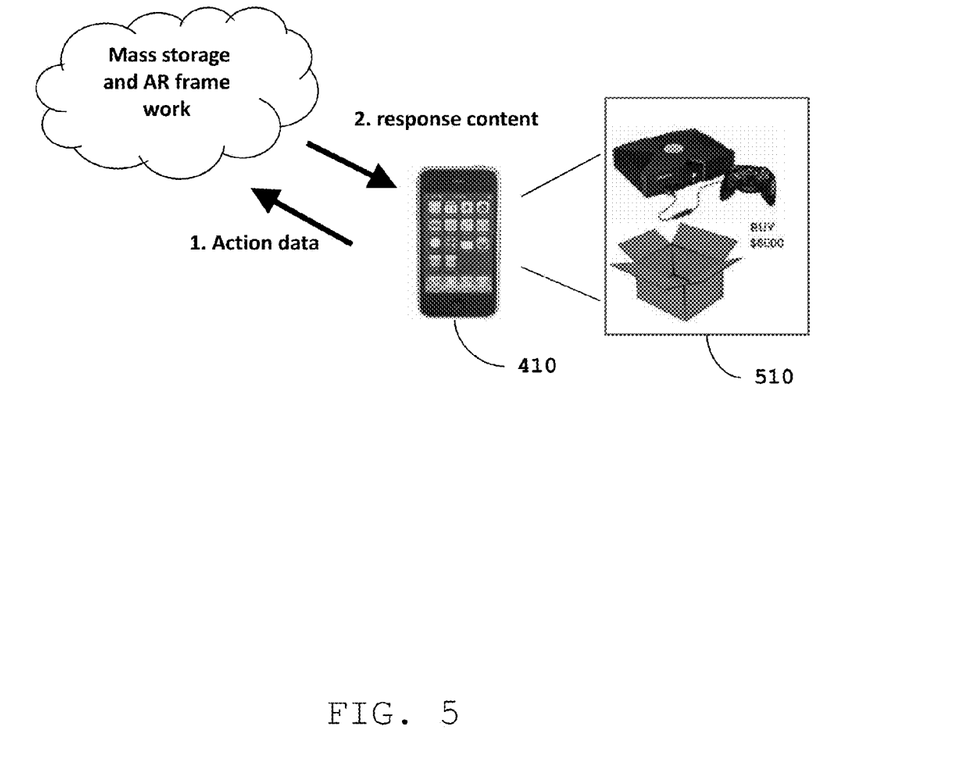
FIG. 5 is an exemplary representation of user interaction on dynamic digital content, in accordance with one embodiment.

FIG. 5 is an exemplary representation of user interaction on dynamic digital content, in accordance with one embodiment.

The dynamic digital content is retrieved by the mobile device 410 as explained in FIG. 4. At this point, a user of the mobile device 410 performs an action. Examples of the action include, but are not limited to, movements of the video camera, change in location of the mobile device 410, and capturing of a new marker.

Data related to the action performed by the user is then sent to a mass storage and Augmented Reality framework.

Based on the data, response content is sent to the mobile device 410. The response content refers to an interaction that the user performs. For example, the user can now buy product 510.

Figure 6:
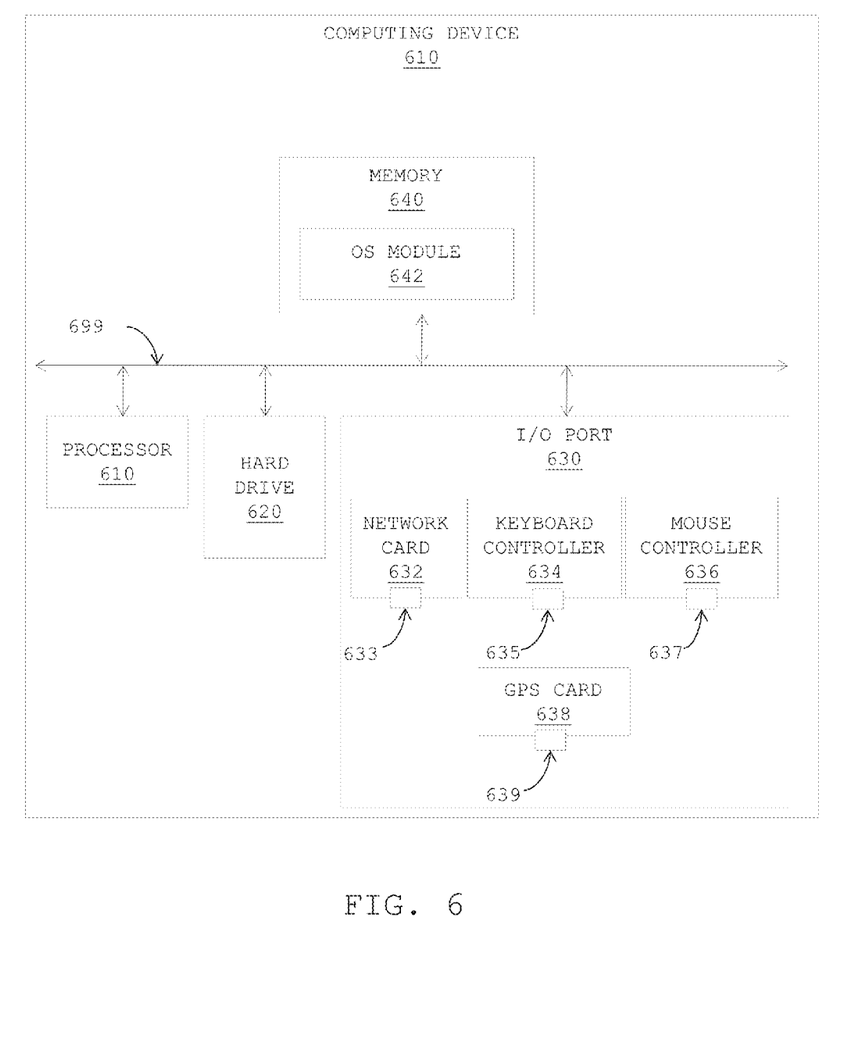
FIG. 6 is a block diagram illustrating a mobile computing device, in accordance with one embodiment.

FIG. 6 is a block diagram illustrating a mobile computing device 610, in accordance with one embodiment.

The computing device 610 includes a processor 610, a hard drive 620, an I/O port 630, and a memory 640, coupled by a bus 699.

The bus 699 can be soldered to one or more motherboards. Examples of the processor 610 includes, but is not limited to, a general purpose processor, an application-specific integrated circuit (ASIC), an FPGA (Field Programmable Gate Array), a RISC (Reduced Instruction Set Controller) processor, or an integrated circuit. There can be a single core or multiple cores processor. In one embodiment, the processor 610 is specially suited for processing demands of location-aware reminders (for example, custom microcode, and instruction fetching, pipelining or cache sizes). The processor 610 can be disposed on silicon or any other suitable material. In operation, the processor 610 can receive and execute instructions and data stored in the memory 640 or the hard drive 620. The hard drive 620 can be a platter-based storage device, a flash drive, an external drive, a persistent memory device, or other types of memory.

The hard drive 620 provides persistent (long term) storage for instructions and data. The I/O port 630 is an input/output panel including a network card 632 with an interface 633, along with a keyboard controller 634, a mouse controller 636, and a GPS card 638. The network card 632 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 633 is configured according to networking compatibility. For example, a wired networking card includes a physical port to plug in a cord, and a wireless networking card includes an antennae. The network card 632 provides access to a communication channel on a network. The keyboard controller 634 can be coupled to a physical port 635 (for example, PS/2 or USB port) for connecting a keyboard. The keyboard can be a standard alphanumeric keyboard with 101 or 104 keys (including alphabetic, numerical and punctuation keys, a space bar, modifier keys, etc.), a laptop or notebook keyboard, a thumb-sized keyboard, a virtual keyboard, or the like. The mouse controller 636 can also be coupled to a physical port 637 (e.g., mouse or USB port). The GPS card 638 provides communication to GPS satellites operating in space to receive location data. An antenna 639 provides radio communications (or alternatively, a data port can receive location information from a peripheral device).

The memory 640 can be a RAM (Random Access Memory), a flash memory, a non-persistent memory device, or other devices capable of storing program instructions being executed. The memory 640 comprises an Operating System (OS) module 642 along with a timer unit 610. In other embodiments, the memory 640 comprises a calendar application that manages a plurality of appointments. The OS module 642 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Many functionalities described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method for providing dynamic digital content within an augmented reality environment by an augmented reality framework, comprising:
receiving, from a client device connected to an augmented reality network in communication with the augmented reality framework, image data captured by a video camera device of the client device that depicts a marker, wherein the marker includes a specific pattern corresponding to a first dynamic digital content and the marker covers, at least in part, a physical product;
receiving, from the client device, first factor information corresponding to a first user;
retrieving first dynamic digital content from a database based on the specific pattern of the marker and the first factor information;
transmitting the first dynamic digital content to the client device for generating a first augmented reality environment on the client device that combines a first current video stream captured by the video camera device and a first virtual video stream including the first dynamic digital content;
receiving, from the client device, second factor information corresponding to a second user;
retrieving second dynamic digital content from the database based on the second factor information;
transmitting the second dynamic digital content to the client device for generating a display of a second augmented reality environment on the client device that combines a second current video stream captured by the video camera device and a second virtual video stream including the second dynamic digital content, wherein the second dynamic digital content is dynamically updated from the first dynamic digital content based on the specific pattern of the marker and the second factor information, the second dynamic digital content having display attributes displayable in accordance with a display capability of the client device;
receiving a user interaction with the second dynamic digital content detected by the client device; and
performing an action based on the user interaction.

2. The method of claim 1, wherein the first dynamic digital content comprises an advertisement related to the physical product.

3. The method of claim 1, further comprising:
converting the marker to a network address, wherein the dynamic digital content is retrieved using the network address.

4. The method of claim 1, wherein the marker comprises a QR code marker.

5. The method of claim 1, wherein a video renderer running on the client device is configured to combine the second current video stream and the second virtual video stream into a single video stream.

6. The method of claim 1, further comprising:
adjusting the second dynamic digital content based on detected movements of the video camera device in relation to the markers.

7. A non-transitory computer-readable medium storing instructions that when executed by a processor included in an augmented reality framework, performs a method for providing dynamic digital content within an augmented reality environment, comprising:
receiving, from a client device connected to an augmented reality network in communication with the augmented reality framework, image data related to a marker captured by the video camera device as covering, at least in part, a physical product, wherein the marker depicts a specific pattern corresponding to dynamic digital content;
receiving, from the client device, first factor information corresponding to a first user;
retrieving first dynamic digital content from a database based on the specific pattern of the marker and the first factor information;
transmitting the first dynamic digital content to the client device for generating a first augmented reality environment on the client device that combines a first current video stream captured by the video camera device and a first virtual video stream including the first dynamic digital content;
receiving, from the client device, second factor information corresponding to a second user;
retrieving second dynamic digital content from the database based on the second factor information;
transmitting the second dynamic digital content to the client device for generating a display of a second augmented reality environment on the client device that combines a second current video stream captured by the video camera device and a second virtual video stream including the second dynamic digital content, wherein the second dynamic digital content is dynamically updated from the first dynamic digital content based on the specific pattern of the marker and the second factor information, the second dynamic digital content having display attributes displayable in accordance with a display capability of the client device;
receiving a user interaction with the second dynamic digital content detected by the client device; and
performing an action based on the user interaction.

8. The non-transitory computer-readable medium of claim 7, wherein the first dynamic digital content comprises an advertisement related to the physical product.

9. The non-transitory computer-readable medium of claim 7, further comprising:
converting the marker to a network address, wherein the dynamic digital content is retrieved using the network address.

10. The non-transitory computer-readable medium of claim 7, wherein the marker comprises a QR code marker.

11. The non-transitory computer-readable medium of claim 7, wherein a video renderer running on the client device is configured to combine the second current video stream and the second virtual video stream into a single video stream.

12. The non-transitory computer-readable medium of claim 7, further comprising:
adjusting the second dynamic digital content based on movements of the video camera device in relation to the markers.

13. A computing device within an augmented reality framework for providing dynamic digital content within an augmented reality environment, comprising:
a network interface in communication with a client device through an augmented reality network, and configured to:
receive, from the client device, image data captured by a video camera device of the client device that depicts a marker, wherein the marker includes a specific pattern corresponding to a first dynamic digital content and the marker covers, at least in part, a physical product;
receive, from the client device, first factor information corresponding to a first user;

retrieve first dynamic digital content from a database, wherein the first dynamic digital content is received based on the specific pattern of the marker and the first factor information;

receive, from the client device, second factor information corresponding to a second user;

retrieve second dynamic digital content from a database, wherein the second dynamic digital content is received based on the specific pattern of the marker and the second factor information; and a dynamic digital content processor configured to:

control the network interface to transmit the first dynamic digital content to the client device for generating a first augmented first augmented reality environment for presentation on the client device that combines a first current video stream captured by the video camera device and a first virtual video stream including the first dynamic digital content;

control the network interface to transmit the second dynamic digital content to the client device for generating a second augmented first augmented reality environment for presentation on the client device that combines a second current video stream captured by the video camera device and a second virtual video stream including the second dynamic digital content, wherein the second dynamic digital content is dynamically updated from the first dynamic digital content based on the specific pattern of the marker and the second factor information, wherein the second dynamic digital content having display attributes displayable in accordance with a display capability of the client device;

receive a user interaction with the second dynamic digital content detected by the client device; and control an interaction module to perform an action based on the user interaction.

14. The computing device of claim 13, wherein the first dynamic digital content comprises an advertisement related to the physical product.

15. The computing device of claim 13, wherein the computing device comprises a mobile computing device.

* * * * *